United States Patent [19]

Sugimoto

[11] Patent Number: 6,055,298
[45] Date of Patent: Apr. 25, 2000

[54] METHOD AND SYSTEM FOR EXECUTION OF TEST PROCEDURES WITH RESPECT TO ELECTRONIC EXCHANGE

[75] Inventor: Nobuhisa Sugimoto, Yokohama, Japan

[73] Assignee: Fujitsu Limited, Kanagawa, Japan

[21] Appl. No.: 09/221,464

[22] Filed: Dec. 28, 1998

[30] Foreign Application Priority Data

May 8, 1998 [JP] Japan ................................. 10-126487

[51] Int. Cl.⁷ .................................................. H04M 1/24
[52] U.S. Cl. ............................ 379/9; 379/10; 395/701; 395/704; 395/708
[58] Field of Search ............................ 379/9, 10, 1, 15, 379/18, 34, 14; 395/701, 704, 500, 708, 706, 712, 185.1, 392, 705, 707

[56] References Cited

U.S. PATENT DOCUMENTS

| | | | |
|---|---|---|---|
| 4,782,506 | 11/1988 | Sevcik | 379/9 |
| 4,860,333 | 8/1989 | Bitzinger et al. | 379/9 |
| 4,940,473 | 8/1999 | Lee | 379/10 |
| 4,945,554 | 7/1990 | Krause et al. | 379/9 |
| 5,241,579 | 8/1993 | Kim et al. | 379/10 |
| 5,353,326 | 10/1994 | Jung | 379/10 |
| 5,384,823 | 1/1995 | Brenski et al. | 379/10 |
| 5,390,232 | 2/1995 | Freeman et al. | 379/10 |
| 5,546,450 | 8/1996 | Suthard et al. | 379/10 |
| 5,717,750 | 2/1998 | Adams, Jr. et al. | 379/10 |
| 5,787,147 | 7/1998 | Gundersen | 379/10 |
| 5,822,397 | 10/1998 | Newman | 379/10 |
| 5,835,566 | 11/1998 | Cowgill | 379/10 |
| 5,838,766 | 11/1998 | Rand | 379/10 |
| 5,854,823 | 11/1998 | Badger et al. | 379/10 |
| 5,854,930 | 12/1998 | McLain, Jr. et al. | 379/10 |
| 5,940,472 | 8/1999 | Newman et al. | 379/10 |
| 5,946,372 | 8/1999 | Jones et al. | 379/10 |
| 5,953,406 | 9/1999 | Larue et al. | 379/10 |
| 5,966,427 | 10/1999 | Shaffer et al. | 379/10 |
| 5,995,968 | 11/1999 | Park et al. | 379/10 |

FOREIGN PATENT DOCUMENTS

| | | |
|---|---|---|
| 3-76361 | 4/1991 | Japan . |
| 3-277050 | 12/1991 | Japan . |
| 5-244272 | 9/1993 | Japan . |
| 6-208484 | 7/1994 | Japan . |

*Primary Examiner*—Curtis A. Kuntz
*Assistant Examiner*—Rexford Barnie
*Attorney, Agent, or Firm*—Helfgott & Karas, PC.

[57] ABSTRACT

A method for the execution of test procedures to test an electronic exchange by inputting commands of a series of test procedures to a test equipment connected to a server, wherein both the sentences of the series of test procedures and setting values contained in the sentences and test execution commands in the form of macro instructions are stored in a procedure parts dictionary, in advance, while making correspondence between these sentences and macro instructions; any procedure parts are combined among the plurality of procedure parts stored in the procedure parts dictionary by a test procedure document creation editor to create a test procedure document file establishing correspondence between both the sentences of the series of test procedures and setting values contained in the sentences and the macro instructions; the test procedure document file is stored in the server; and the test procedure document is read from the test procedure document file in the server and the test of the electronic exchange is executed according to the macro instructions in the test procedure document.

11 Claims, 19 Drawing Sheets

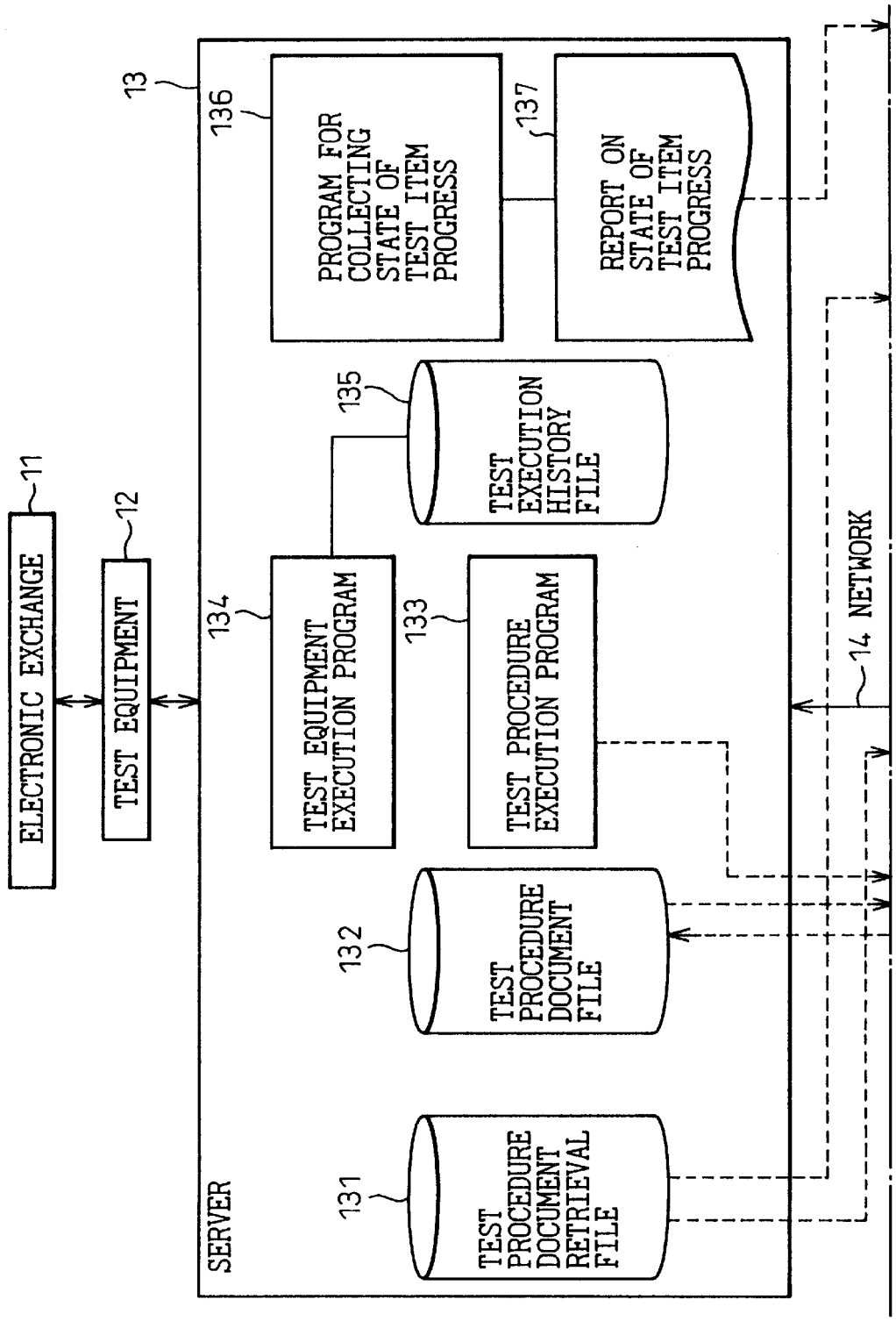

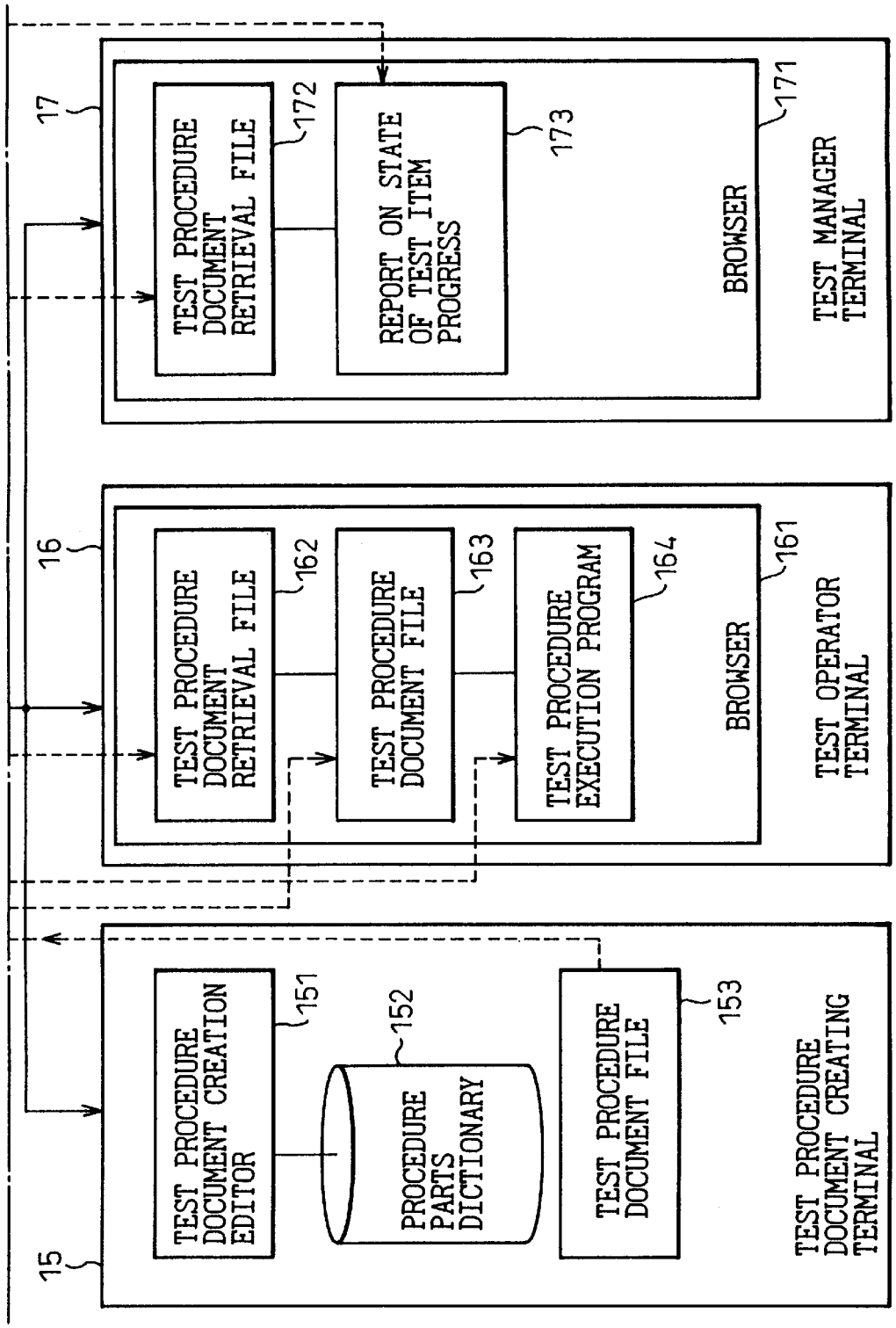

Fig.2A

TABLE(A)

| No. | CLASSI-FICATION | TEST PROCEDURE SENTENCE | PROCEDURE IN MACRO INSTRUCTION |
|---|---|---|---|
| 1 | CALL PROCEDURE | TELEPHONE NUMBER OF SUBSCRIBER TELEPHONE [TELSUB] IS DESIGNATED TO [TELNO] | \<TEC>ALS S, [TELSUB]-[TELNO]/ |
| 2 | CALL PROCEDURE | CALL FORWARDING SERVICE IS SET TO SUBSCRIBER TELEPHONE [TELSUB] | \<TYP>CHA SBS:TYP;¥n \<TYP>SVRG,DN=[TELSUB, TELNO],CFU=Y,OFUG=TOL; |
| 3 | CALL CONFIRMATION PROCEDURE | WHETHER CALL FORWARDING SERVICE IS SET IS CONFIRMED | \<TYP>DIS SBS:SVC, DN= [TELSUB.TELNO];¥n\<SRC> DN=[TELSUB.TELNO] (AND) CFU=Y |
| 4 | CALL PROCEDURE | HANDSET OF SUBSCRIBER TELEPHONE [TELSUB] IS PICKED UP (OFF-HOOK) | \<TEC>OFHOOK[TELSUB]/ |
| 5 | CALL CONFIRMATION PROCEDURE | SOUND [TONE] FROM SUBSCRIBER TELEPHONE [TELSUB] IS CONFIRMED | \<TEC>MSTREQ DV/¥n \<TEC>SGTREC[TELSUB], [TONE]/ |
| 6 | CALL PROCEDURE | CALL FORWARDING FROM SUBSCRIBER TELEPHONE [TELSUB.1] TO [TELSUB.2] IS REGISTERED | \<TEC>LNDIAL[TELSUB.1] CFUAC/¥n\<TEC>LNDIAL [TELSUB.1],[TELSUB.2]/ ¥n\<TEC>LNDIAL[TELSUB.1], ENDCD/ |

Fig.2B

| No. | CLASSI-FICATION | TEST PROCEDURE SENTENCE | PROCEDURE IN MACRO INSTRUCTION |
|---|---|---|---|
| 7 | CALL PROCEDURE | DIAL FROM SUBSCRIBER TELEPHONE [TELSUB.1] TO [TELSUB.2] | <TEC>LNDIAL[TELSUB.1],[TELSUB.2]/ |
| 8 | CALL PROCEDURE | SPEAKING BETWEEN SUBSCRIBER [TELSUB.1] AND [TELSUB.2] IS ACHIEVED | <TEC>TAKIN[TELSUB.1],[TELSUB.2]/ |
| 9 | CALL PROCEDURE | HANDSET OF SUBSCRIBER TELEPHONE [TELSUB] IS HUNG UP | <TEC>ONHOOK[TELSUB]/ |

TABLE(B)

| No. | NOTATION OF PROCEDURE | SETTING VALUE |
|---|---|---|
| 1 | TELSUB | SELECT[A1,B1,C1,D1,E1,F1] |
| 2 | TELNO | INPUT[LENGTH=10,RANGE=NUMBER] |
| 3 | TONE | SELECT[DT,SAT,RBT] |

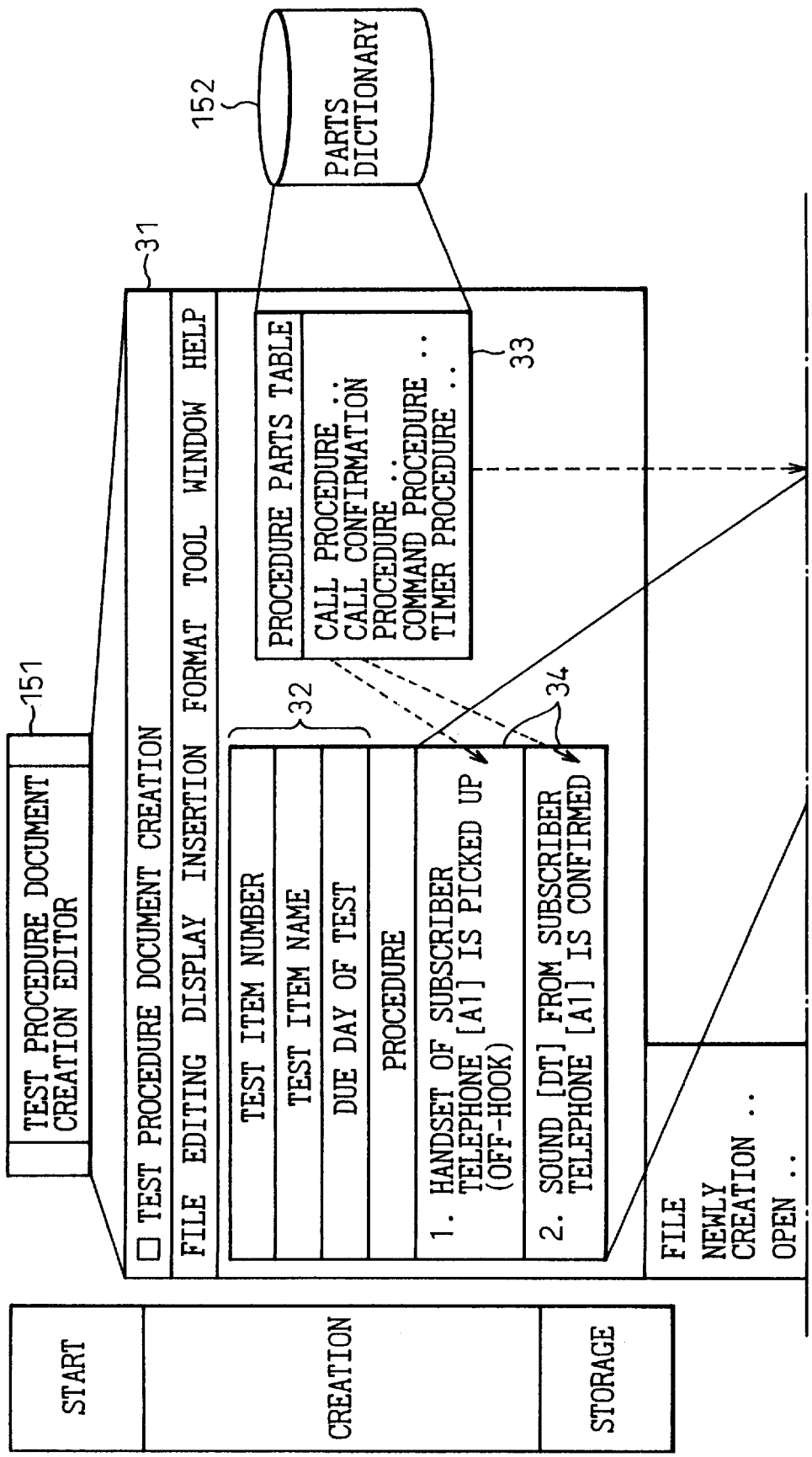

Fig. 5A

| TEST PROCEDURE | MACRO INSTRUCTION |
|---|---|
| 5-1. TELEPHONE NUMBER OF SUBSCRIBER TELEPHONE [A1] IS DESIGNATED TO [9821001] | \<TEC>ALC S,A1-9821001/ |
| 5-2. TELEPHONE NUMBER OF SUBSCRIBER TELEPHONE [B1] IS DESIGNATED TO [9821002] | \<TEC>ALC S,B1-9821002/ |
| 5-3. TELEPHONE NUMBER OF SUBSCRIBER TELEPHONE [C1] IS DESIGNATED TO [9821003] | \<TEC>ALC S,C1-9821003/ |
| 5-4. CALL FORWARDING SERVICE IS LOADED IN SUBSCRIBER TELEPHONE [A1] | \<TYP>CHA SBS:TYP;<br>\<TYP>SVRG,DN=9821001,CFU=Y,OFUOG=TOL; |
| 5-5. WHETHER CALL FORWARDING SERVICE IS LOADED IS CONFIRMED | \<TYP>DIS SBS:SVC,DN=9821001;<br>\<SRC>DN=9821001(AND)CFU=Y |
| 5-6. HANDSET OF SUBSCRIBER TELEPHONE [A1] IS PICKED UP (OFF-HOOK) | \<TEC>OFHOOK A1/ |
| 5-7. SOUND [DT] FROM SUBSCRIBER TELEPHONE [A1] IS CONFIRMED | \<TEC>MSTREQ DV/<br>\<TEC>SGTREC A1,DT/ |
| 5-8. CALL FORWARDING FROM SUBSCRIBER TELEPHONE [A1] TO [B1] IS REGISTERED | \<TEC>LNDIAL A1,CFUAC/<br>\<TEC>LNDIAL A1,B1/<br>\<TEC>LNDIAL A1,ENDCD/ |
| 5-9. SOUND [SAT] FROM SUBSCRIBER TELEPHONE [A1] IS CONFIRMED | \<TEC>MSTREQ DV/<br>\<TEC>SGTREC A1,SAT/ |

Fig.5B

| TEST PROCEDURE | MACRO INSTRUCTION |
|---|---|
| 5-10. HANDSET OF SUBSCRIBER TELEPHONE [A1] IS HUNG UP | <TEC>ONHOOK A1/ |
| 5-11. HANDSET OF SUBSCRIBER TELEPHONE [C1] IS PICKED UP (OFF-HOOK) | <TEC>OFHOOK C1/ |
| 5-12. SOUND [DT] FROM SUBSCRIBER TELEPHONE [C1] IS CONFIRMED | <TEC>MSTREQ DV/<br><TEC>SGTREC C1,DT/ |
| 5-13. DIAL FROM SUBSCRIBER TELEPHONE [C1] TO [A1] | <TEC>LNDIAL C1,A1/ |
| 5-14. SOUND [RBT] FROM SUBSCRIBER TELEPHONE [C1] IS CONFIRMED | <TEC>MSTREQ DV/<br><TEC>SGTREC C1,RBT/ |
| 5-15. HANDSET OF SUBSCRIBER TELEPHONE [B1] IS PICKED UP (OFF-HOOK) | <TEC>OFHOOK B1/ |
| 5-16. SPEAKING BETWEEN SUBSCRIBER TELEPHONE [C1] AND [B1] IS ACHIEVED | <TEC>TALKIN C1,B1/ |
| 5-17. SPEAKING BETWEEN SUBSCRIBER TELEPHONE [B1] AND [C1] IS ACHIEVED | <TEC>TALKIN B1,C1/ |
| 5-18. HANDSET OF SUBSCRIBER TELEPHONE [C1] IS HUNG UP | <TEC>ONHOOK C1/ |
| 5-19. HANDSET OF SUBSCRIBER TELEPHONE [B1] IS HUNG UP | <TEC>ONHOOK B1/ |

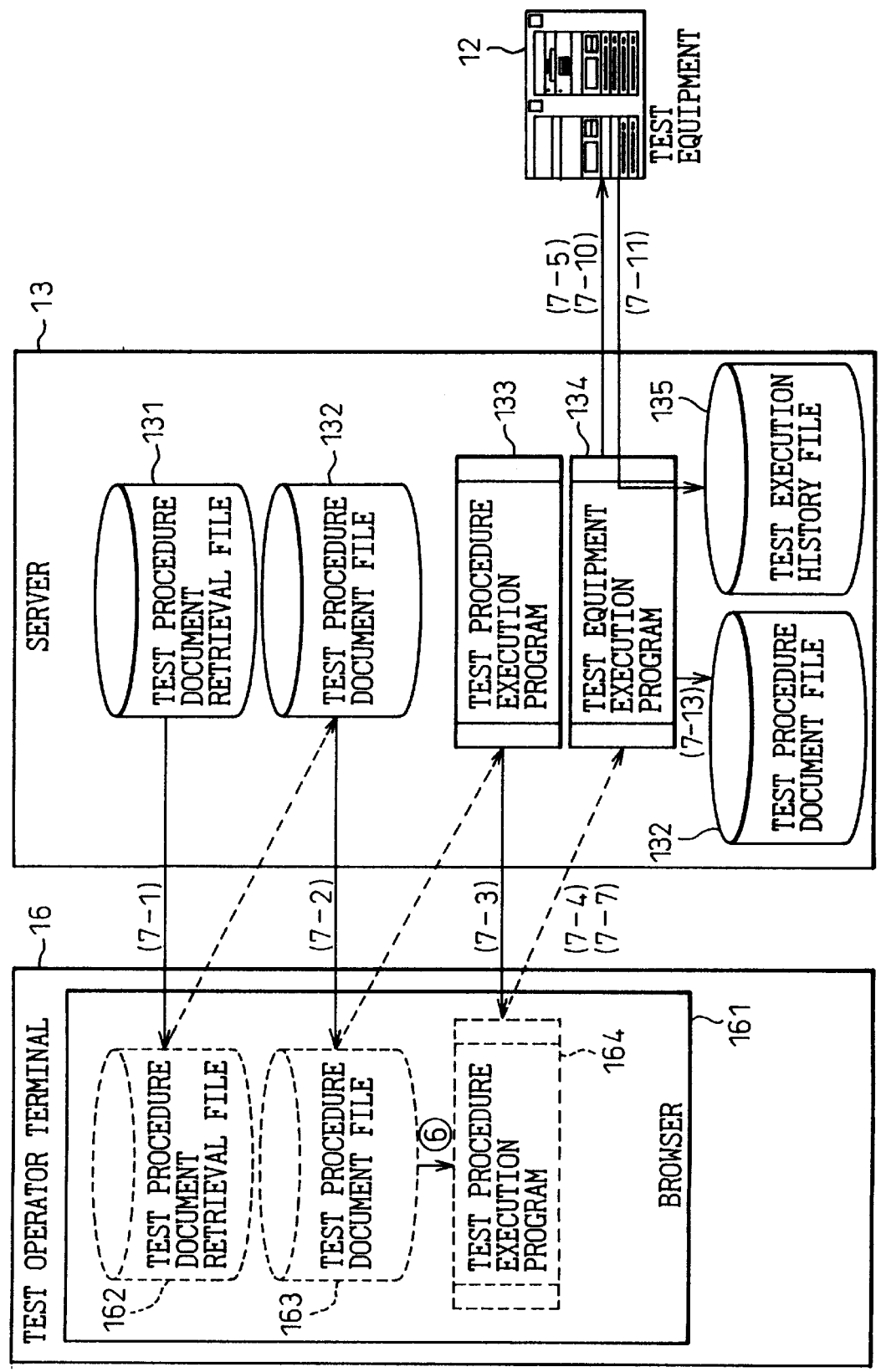

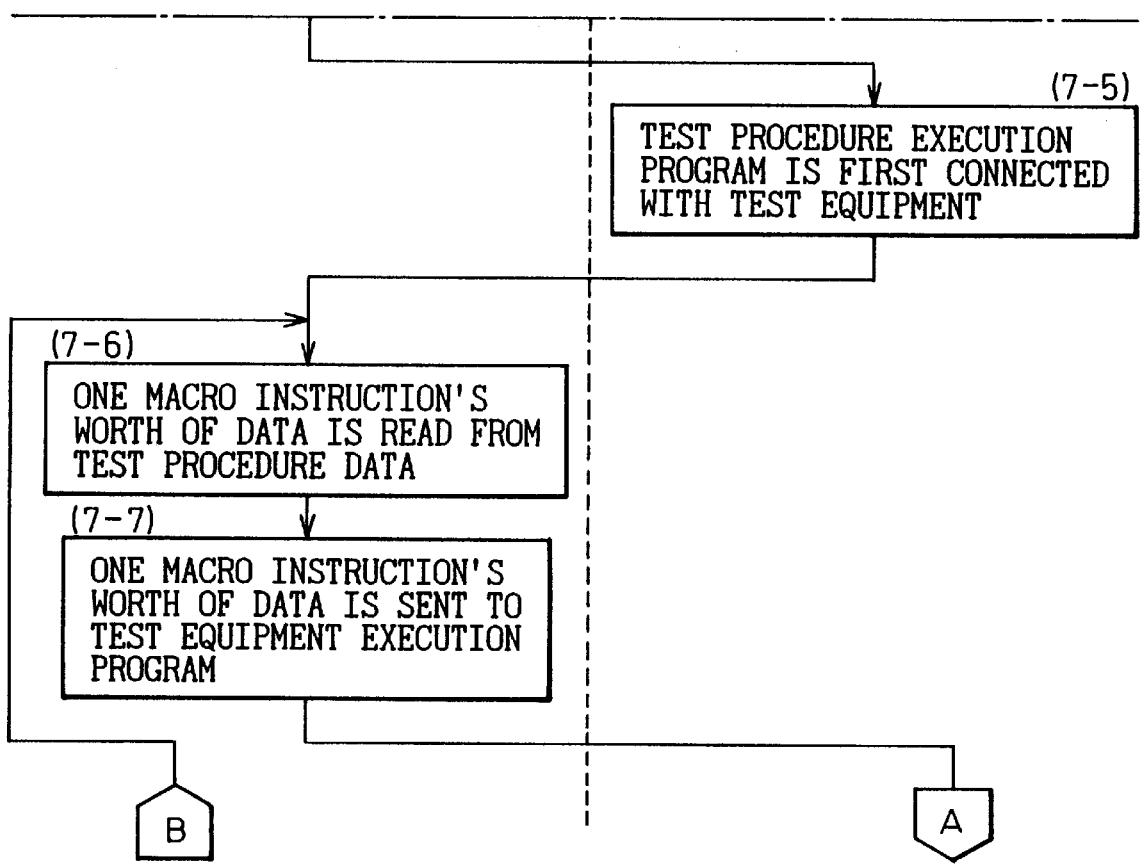

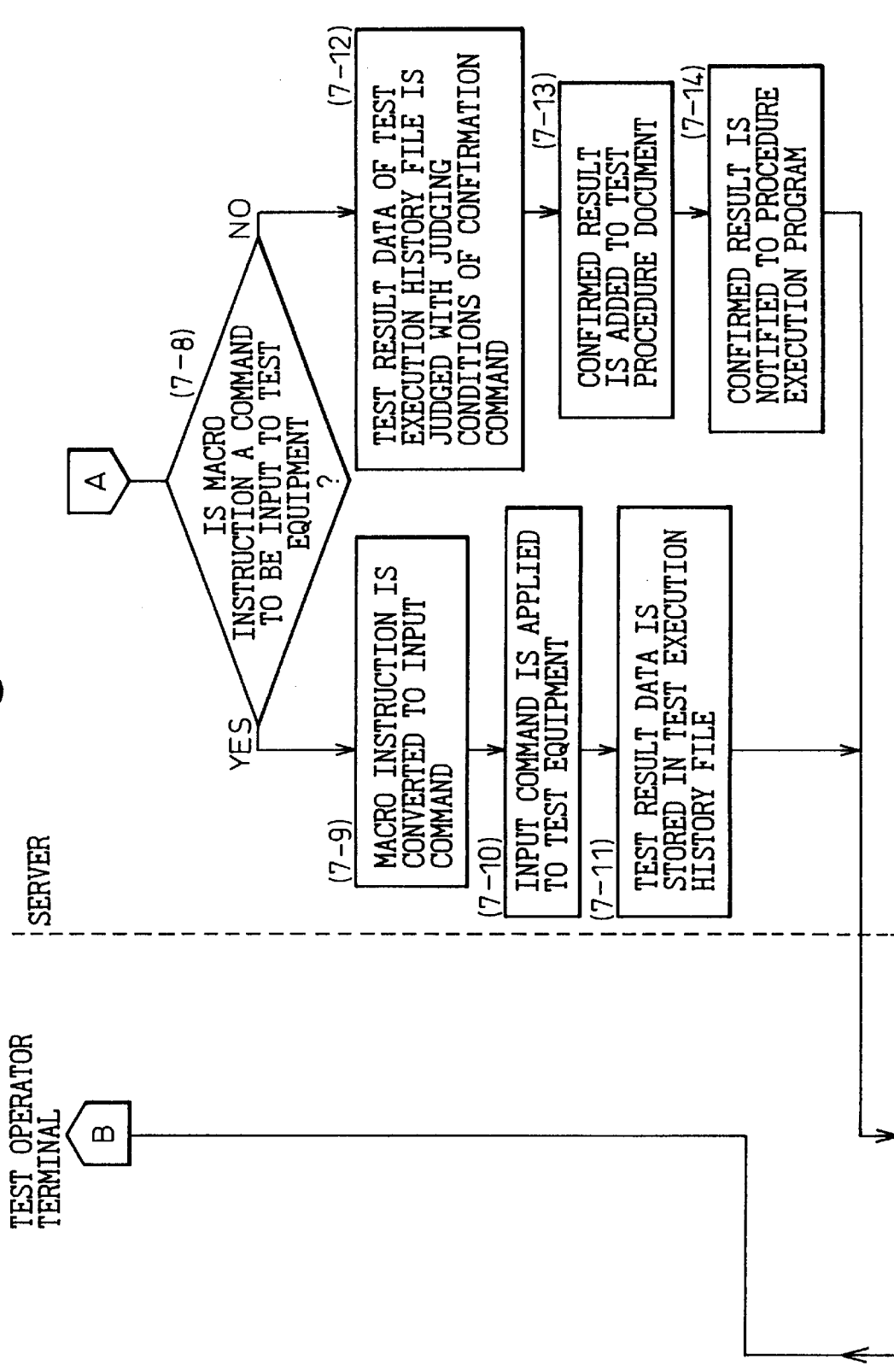

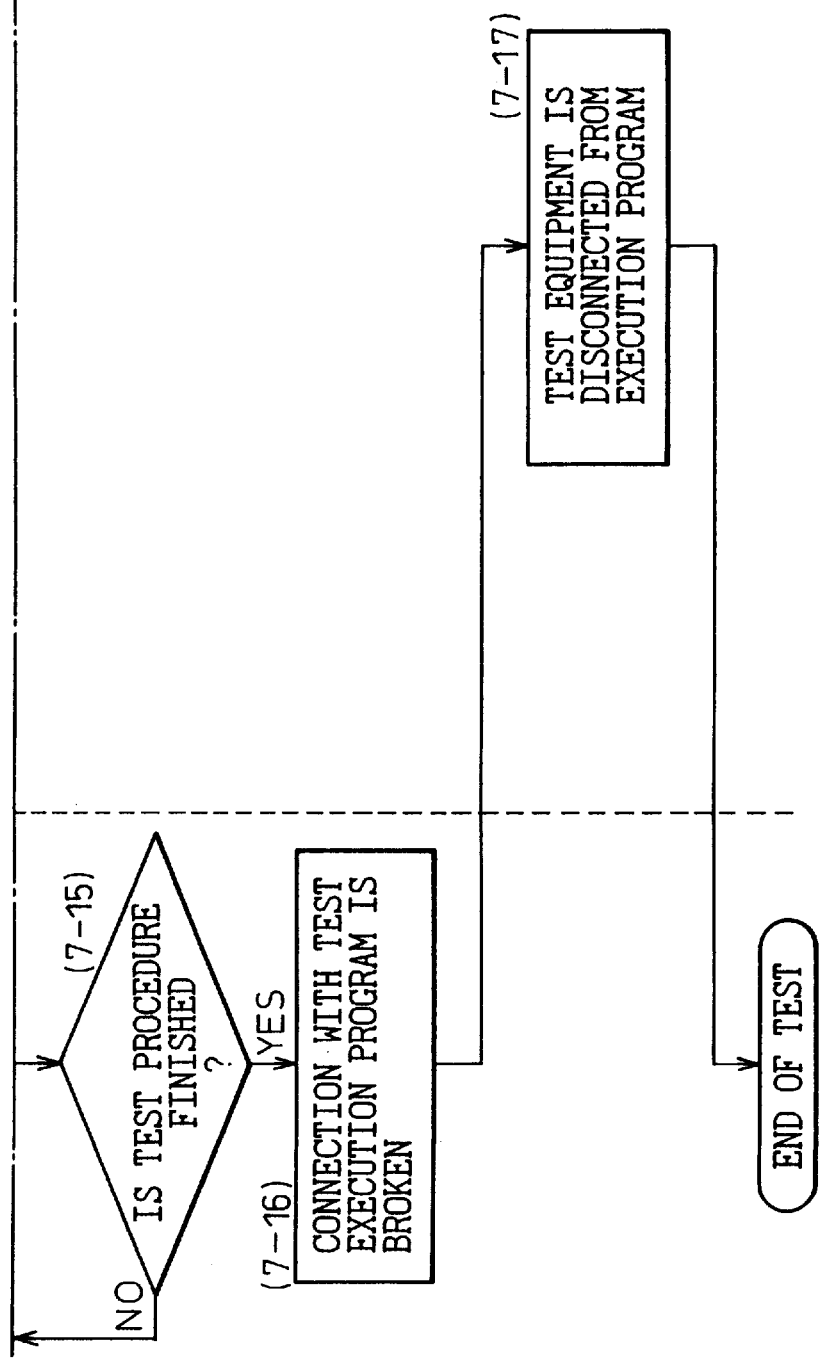

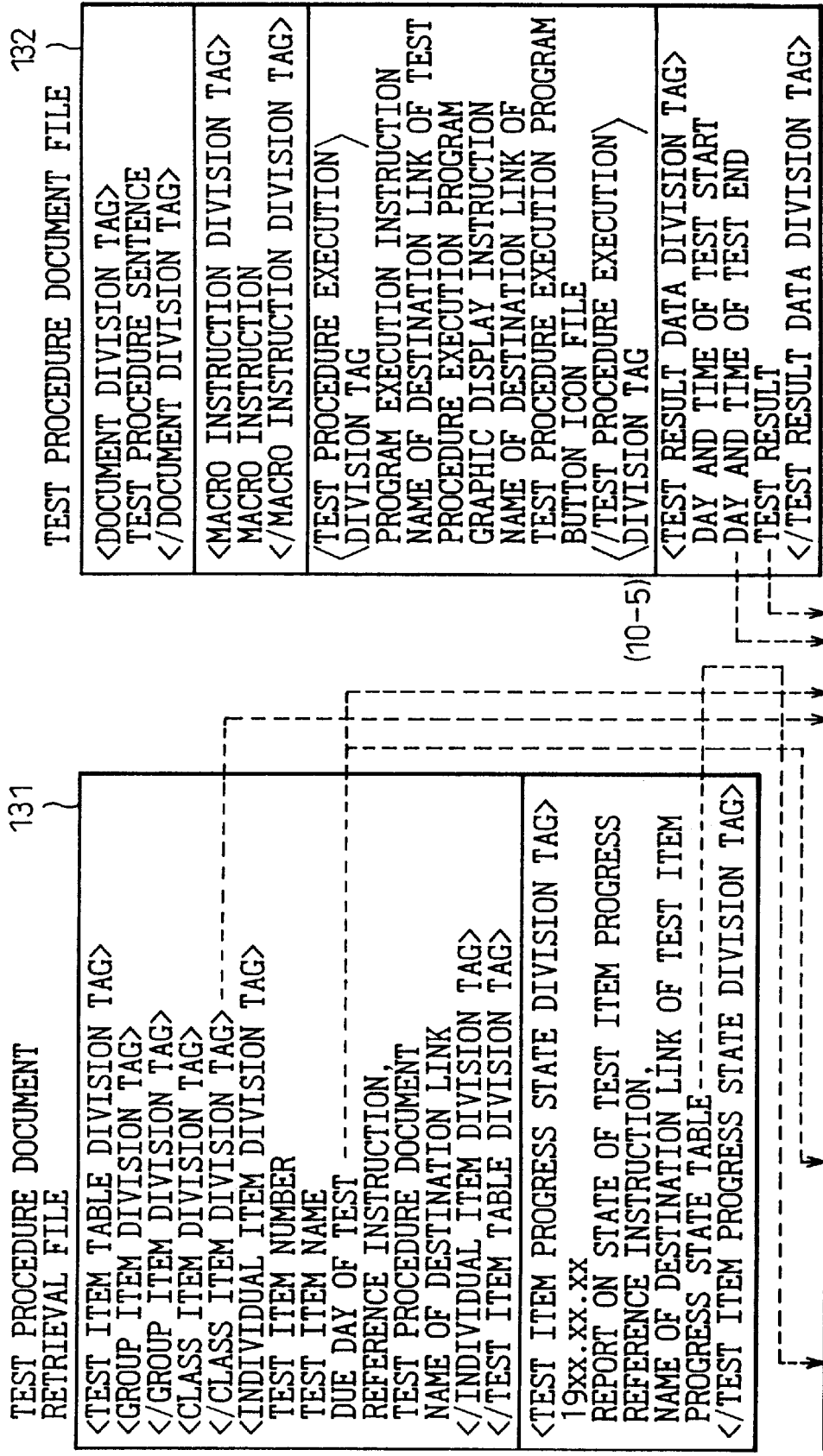

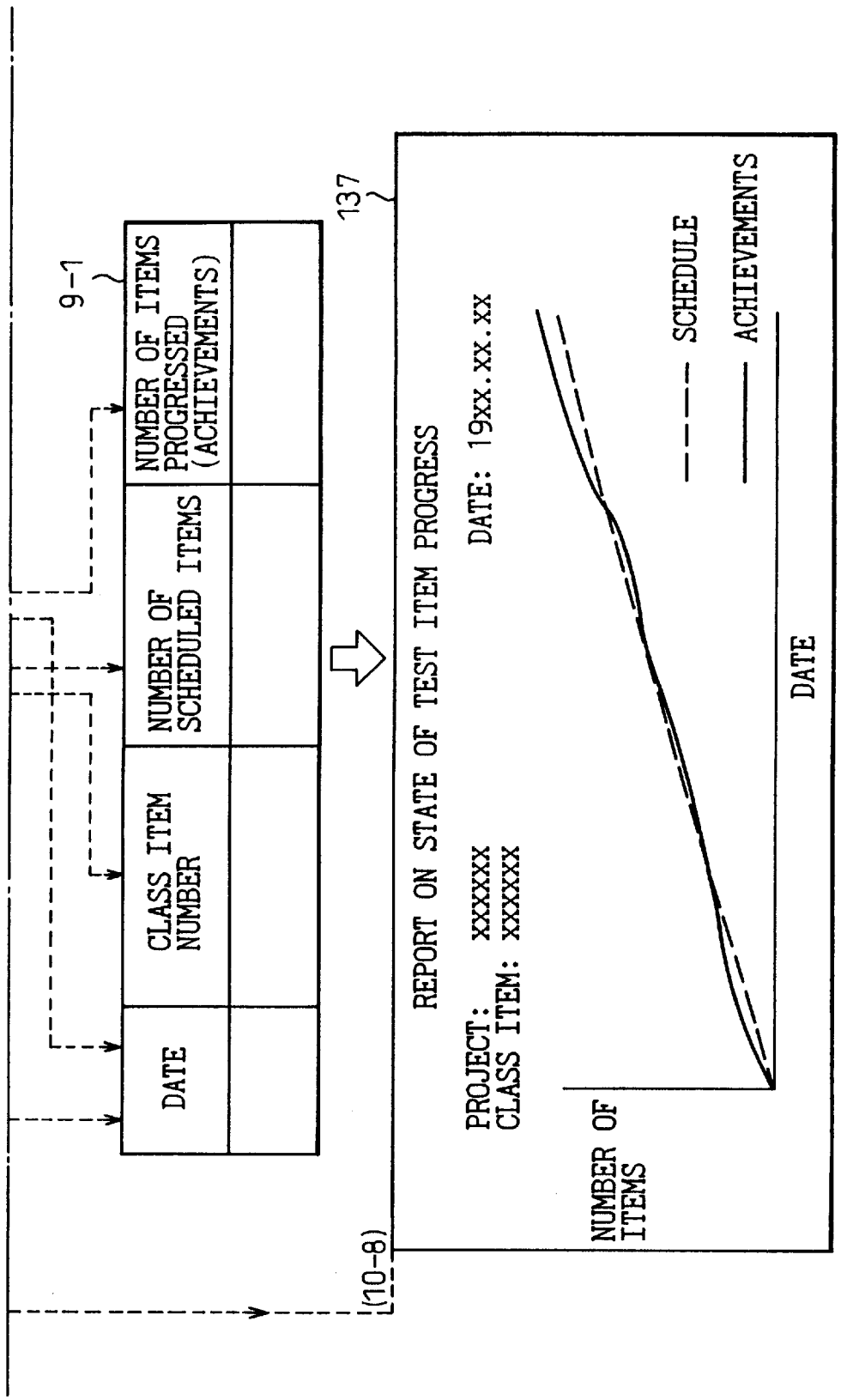

METHOD AND SYSTEM FOR EXECUTION OF TEST PROCEDURES WITH RESPECT TO ELECTRONIC EXCHANGE

BACKGROUND OF THE INVENTION

1. Field of the Invention

The present invention relates to a method for execution of test procedures with respect to an electronic exchange and a system for the same, more particularly relates to a method of creation of a test procedure document for an electronic exchange, execution of a test by the test procedure document, and management of the state of test progress and a system for the same.

In an automatic test of an electronic exchange, the electronic exchange is tested by creating a test procedure document (test command file) described by a language of a format which the test equipment of the electronic exchange can accept as well as a test procedure document describing the test procedure by ordinary sentences, giving the commands of the test procedure document (test command file) to the test equipment of the electronic exchange, and making it execute the commands.

After making the test equipment of the electronic exchange execute the commands of the test procedure document (test command file) to make the electronic exchange perform the test operation, the data of the results of the execution of the test operation and the correct answer data at the time of a normal operation created in advance are compared and a judgement of the test results is carried out. Further, when performing the comparison, a mask is appropriately applied to the data not influencing the judgement of the test results obtained by the test operation of the electronic exchange. The mask is only opened at the positions at which the above comparison must match at the least. The test results are checked and judged by examining the match at the above opened positions from the mask.

2. Description of the Related Art

In the automatic test of an electronic exchange of the related art, the test procedure document (test command file) is described by special commands unique to the test equipment of the electronic exchange, therefore unless one is a skilled person well versed in the above special commands, it is difficult to create the test procedure document. Therefore, a test operator carries out the maintenance and inspection by using the test procedure document created by a skilled person to test the electronic exchange.

Thus, the creator of the test procedure document and the test operator are different, and therefore the test operator spends much time and effort for understanding the content of the test procedure document. Further, mistakes or errors, existing in the created test procedure document, are often found when actually testing the electronic exchange. The test is therefore often interrupted due to such mistakes or errors contained in the test procedure document. This becomes sometimes an obstacle to the progress of predetermined test items. Further, at this time, there is a problem in that much effort is required for understanding the correspondence between the test command file and the written test procedure document.

Further, the written test procedure document describes the method of confirmation of the test results, but the test command file does not describe the method of confirmation of the test results. Furthermore, there are cases in which the method of judgement of the test results differs depending on the created test command file, and therefore the results must be judged by different types of judgement methods. In such a case, there is a problem that a detailed method of judgement cannot be designated for every test command file.

Further, the test results after executing the automatic test procedure were merely stored in a data base comprised of only the data of the test results. For this reason, the test procedure document, test results, and the test execution history file were separately managed and it was extremely difficult to achieve a check by comparing the correspondence among them.

SUMMARY OF THE INVENTION

Therefore, an object of the present invention is to make it possible to easily and efficiently create a test procedure document when creating a test procedure document using special commands unique to the test equipment of the electronic exchange, make it possible to quickly check the created test procedure document, make it possible to judge the detailed test results during the execution of the test, and further make it easy to establish correspondence between the test procedure document and the test results in one file so as thereby to achieve an enhancement of the efficiency of both the creation of the test procedure document of the electronic exchange and test steps and also an improvement of the reliability of the test procedure document.

To attain the above object, the present invention provides a method for the execution of test procedures to test an electronic exchange by inputting commands of a series of test procedures to a test equipment connected to a server, wherein both the sentences of the series of test procedures and setting values contained in the sentences and test execution commands in the form of macro instructions are stored in a procedure parts dictionary, in advance, while making correspondence among these sentences, setting values and macro instructions; any procedure parts are combined among the plurality of procedure parts stored in the procedure parts dictionary by a test procedure document creation editor to create a test procedure document file establishing correspondence between both the sentences of the series of test procedures and setting values contained in the sentences and the macro instructions; the test procedure document file is stored in the server; and the test procedure document is read from the test procedure document file in the server and the test of the electronic exchange is executed according to the macro instructions in the test procedure document. By this, the enhancement of efficiency of both the creation of the test procedure document of the electronic exchange and the test steps and also the improvement of the reliability of the test procedure document, are achieved.

BRIEF DESCRIPTION OF THE DRAWINGS

The above object and features of the present invention will be more apparent from the following description of the preferred embodiments given with reference to the accompanying drawings, wherein:

FIGS. 1A and 1B are views of the configuration of a test procedure execution system according to an embodiment of the present invention;

FIGS. 2A and 2B are explanatory views of a procedure parts dictionary according to the embodiment of the present invention;

FIGS. 3A and 3B are explanatory views of creation of a test procedure document according to the embodiment of the present invention;

FIGS. 5A and 5B are views of an example of the creation of a test procedure document according to the embodiment of the present invention;

FIG. 6 is an explanatory view of the execution of test procedures according to the embodiment of the present invention;

FIGS. 7A and 7B are flow charts of the execution of test procedures according to the embodiment of the present invention;

FIGS. 8A and 8B are flow charts of the execution of test procedures according to the embodiment of the present invention;

FIGS. 9A and 9B are explanatory views of the creation of a report on the state of progress in test items according to the embodiment of the present invention.

DESCRIPTION OF THE PREFERRED EMBODIMENTS

Figure 3B:
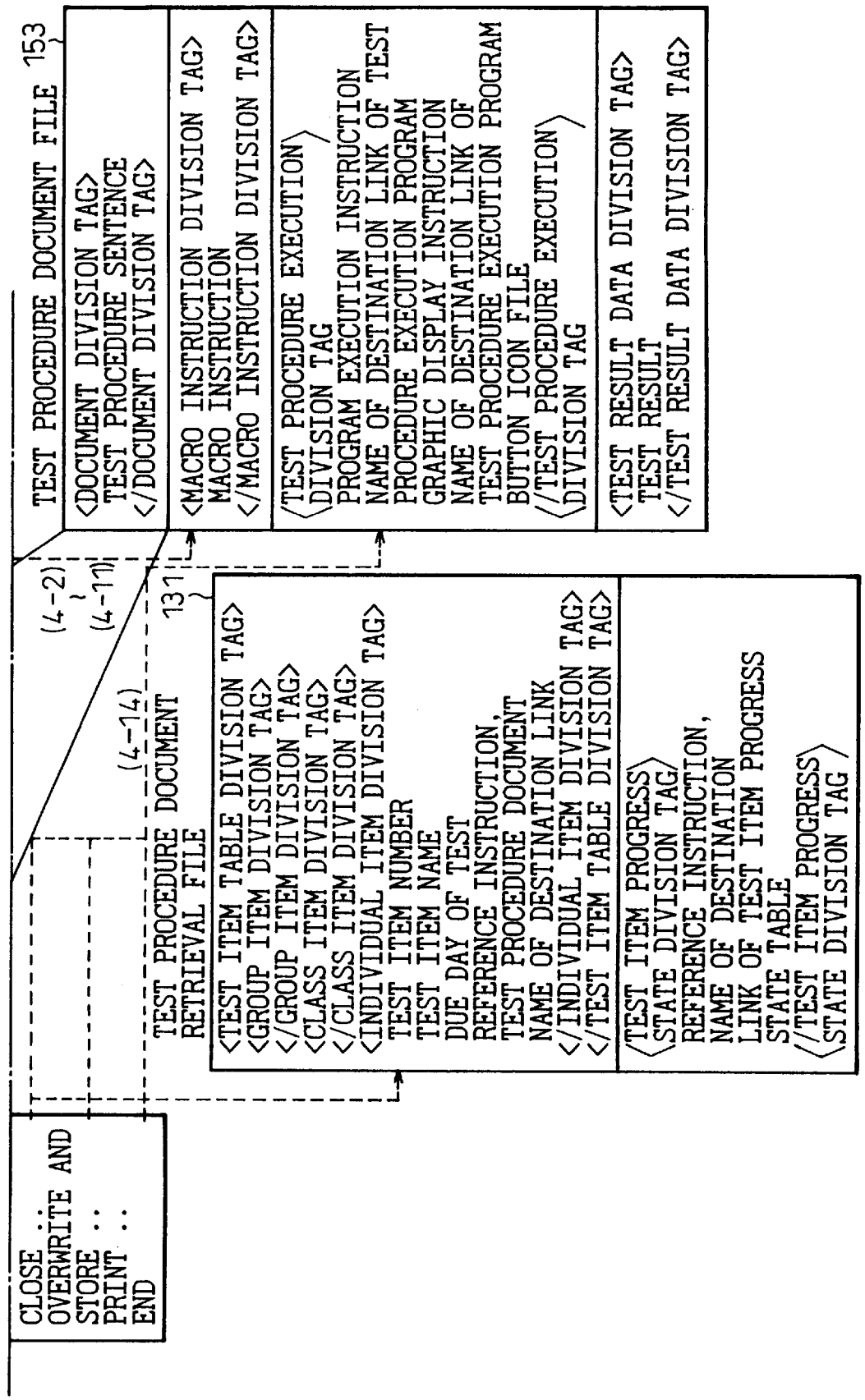

First, a description will be given of the gist of aspects and embodiments according to the concept of the present invention.

According to a first aspect of the present invention, there is provided a method for execution of test procedures to test an electronic exchange comprising a step of combining, by using a procedure parts dictionary storing procedure parts comprising both sentences of test procedures and setting values contained in the sentences and test execution commands in the form of macro instructions while making correspondence among these sentences, setting values and macro instructions and a test procedure document creation editor, a plurality of selected procedure parts, generating a test procedure document comprising both sentences of a series of the test procedures and setting values contained in the sentences and macro instructions, in making correspondence among these sentences, setting values and macro instructions, and storing the test procedure document in a test procedure document file and a step of reading the test procedure document from the test procedure document file by a browser, reading the macro instructions in the test procedure document, starting a test procedure execution program linked with the macro instructions, sending the macro instructions to a test equipment execution program by the test procedure execution program, and inputting test commands to the test equipment connected to the electronic exchange.

According to this configuration, the test procedure creation editor fetches the sentences of test procedures in the procedure parts dictionary and the macro instructions corresponding to the sentences of the test procedures, discriminates the notations of the procedures contained in both the test procedure sentences and the macro instructions, and indicates a range of setting values corresponding to the notations of the procedures by a table storing the correspondence between notations of procedures and ranges of setting values. The test procedure document creator sets the setting values from the indicated range, whereby both the test procedure sentences and the macro instructions corresponding to the test procedure sentences are created.

For this reason, the test procedure document creator can easily create the test procedure document even if the creator is not well versed in the composition of macro instructions. Further, since use is made of test procedure sentences prepared in advance as procedure parts, a test procedure document of a standardized format is created without regard as to the degree of skill of the test procedure document creator and the number of years of the creator's experience.

Further, the test procedure document is displayed as sentences by a browser (software for retrieval and inspection), and the test operator view the display and start the test procedure execution program on the browser and can execute the test of the electronic exchange by the links between the macro instructions described in the test procedure document and the test procedure execution program.

Then, the started test procedure execution program fetches the displayed macro instructions in the test procedure document and sends the macro instructions to the test equipment execution program. The test equipment execution program inputs the macro instructions, as the commands, to the test equipment, whereby the test procedures are executed. For this reason, it becomes possible to execute the test for the test procedure document in a sentence format as it is.

According an embodiment of the first aspect, the procedure parts dictionary includes confirmation procedure parts comprising sentences of confirmation procedures and macro instructions which are confirmation procedure execution commands, while making correspondence between these sentences and macro instructions and further provision is made of a step of reading the macro instructions in the test procedure document containing confirmation procedures generated by the test procedure document creation editor and inputting the test commands including the confirmation commands to the test equipment connected to the electronic exchange and a step of writing data of the test results into the test procedure document file.

According to this configuration, the test procedure execution program sends the macro instructions of the confirmation procedures in the test procedure document to the test equipment execution program. The test equipment execution program judges the test results stored in a test execution history file by confirmation procedures according to macro instructions of the confirmation procedures.

For this reason, the test results can be judged during the execution of the test procedures and therefore faulty locations can be quickly found. Further, the test equipment execution program outputs the judged test results to the test procedure document file, so the test results are automatically recorded and therefore a recording of the test results is never forgotten.

According to another embodiment of the first aspect of the invention, further provision is made of a step of retrieving the test procedure document file by a test procedure document retrieval file, periodically extracting the data of the test results in the test procedure document file by a program for collecting data on the state of progress in test items, and collecting the data of the test results to create a report on state of progress in the test items.

According to this configuration, since the test procedure document is retrieved from the test procedure document retrieval file, the test results in the test procedure document are periodically collected, and a report on the state of progress in test items is periodically created, and thereby the state of progress in the execution of the test can be easily supervised.

According to a second aspect of the present invention, there is provided a system for execution of test procedures to test an electronic exchange comprising a server connected to test equipment for testing the electronic exchange, a test procedure document creating terminal and a test operator terminal, both connected to the server, the test procedure document creating terminal being provided with a memory device storing a procedure parts dictionary storing procedure parts comprising both sentences of the test procedures and setting values contained in the sentences and test execution commands in the form of macro instructions, while making correspondence among these sentences, setting values and macro instructions and a test procedure document creation editor for creating a test procedure document comprising sentences of a series of test procedures, comprised from a plurality of procedure parts selected from the procedure parts dictionary, setting values contained in the sentences and macro instructions, while making correspondence among these sentences, setting values and macro instructions, the server being provided with a memory device storing a test procedure document file for storing the test procedure document created by the test procedure document creating terminal, a test procedure document retrieval file for retrieving the test procedure document file, a test procedure execution program linked to the macro instructions in the test procedure documents, and a test equipment execution program for inputting the test commands to the test equipment based on the macro instructions sent by the test procedure execution program and the test operator terminal being provided with a memory device storing a browser for reading the test procedure document retrieval file, test procedure document file, and test procedure execution program, all contained in the server, and starting the test procedure execution program read by the browser so as to execute the test procedures.

According to an embodiment of the second aspect of the invention, the procedure parts dictionary comprising sentences of confirmation procedures and confirmation procedure execution commands in the form of macro instructions, while making correspondence between these sentences and macro instructions the test procedure document creation editor is configured to generate the test procedure document comprised of sentences of a series of the test procedures comprised from a plurality of the procedure parts including the confirmation procedures selected from the procedure parts dictionary and macro instructions, while making correspondence between these sentences and macro instructions and the server is provided with a test execution history file for storing data of the results of tests executed by the test procedure execution program and is configured to judge the test results from the test execution history file by the macro instructions of the confirmation procedures and store the results in the test procedure document file.

According to a further detailed form of this embodiment of the second aspect of the invention, the server is provided with a memory device for storing a program for collecting data on the state of progress in test items which periodically extracts the data of the test results in the test procedure document file and collects the data of the test results to create a report on the state of progress in the test items and is provided with a test manager terminal which is connected to the server and has a memory device for storing a browser to read the report on the state of progress in the test items created by the program for collecting data on the state of progress in the test items.

According to another embodiment of the second aspect of the invention, the server and at least one of the test procedure document creating terminal and the test operator terminal are connected via a network.

According to a more detailed form of the second aspect of the invention, the server and the test manager terminal are connected via a network.

Detailed preferred embodiments of the aspects of the present invention will be described next with reference to the related figures.

FIGS. 1A and 1B are views of the configuration of a system for execution of test procedures according to an embodiment of the present invention. In the figure, 11 is an electronic exchange, 12 a test equipment, 13 a server, 131 a test procedure document retrieval file, 132 a test procedure document file, 133 a test procedure execution program, 134 a test equipment execution program, 135 a test execution history file, 136 a program for collecting data on the state of progress in test items, 137 a report on the state of progress in test items, 14 a network, 15 a test procedure document creating terminal, 151 a test procedure document creation editor, 152 a procedure parts dictionary, 153 a test procedure document file, 16 a test operator terminal, 161 a browser, 162 a test procedure document retrieval file, 163 a test procedure document file, 164 a test procedure execution program, 17 a test manager terminal, 171 a browser, 172 a test procedure document retrieval file, and 173 a report on the state of progress in test items.

The electronic exchange 11 to be tested operates by the test commands etc. from the test equipment 12. The results of the operation are returned to the test equipment 12. The test equipment 12 is connected to the server 13 in the work station, while the server 13 is connected to the test procedure document creating terminal 15, the test operator terminal 16 comprising the work station etc. and the test manager terminal 17 via the network 14.

Accordingly, the electronic exchange 11 uses the test procedure document creating terminal 15, the test operator terminal 16, and the test manager terminal 17 for the test and the confirmation thereof by the test via the network 14, server 13, and test equipment 12.

The server 13 stores therein the test procedure document retrieval file 131, the test procedure document file 132, the test procedure execution program 133, the test equipment execution program 134, the test execution history file 135 storing the test execution history output by the test equipment execution program 134, the program 136 for collecting data on the state of progress in test items, and the report 137 on the state of progress in test items output by the program 136 for collecting data on the state of progress in test items.

The test procedure document creating terminal 15 is the terminal which stores the test procedure document creation editor 151 and the procedure parts dictionary 152 and creates the test procedure document file 153 by using them.

The test procedure operator terminal 16 is the terminal which fetches the test procedure document retrieval file 131, test procedure document file 132, and test procedure execution program 133 stored in the server 13 via the network 14 by using the browser (software for retrieval and inspection) 161, starts the test procedure execution program by using them, and thereby executes the test procedure.

The test manager terminal 17 is the terminal which fetches the test procedure document retrieval file 131 and the report 137 on the state of progress in test items stored in the server 13 by using the browser 171 and manages the state of progress in test items by using them.

FIGS. 2A and 2B are explanatory views of the procedure parts dictionary according to the embodiment of the present invention. The procedure parts dictionary 152 is constituted by both a table (A) storing the types of the test procedures, sentences of the test procedures, and macro instructions corresponding to the test procedures and a table (B) storing the notations of procedures contained in both the sentences of the test procedures and the macro instructions and candidate values of the setting values or ranges of setting values corresponding to the above notations of procedures. Note that the confirmation procedures carried out together with the test procedures are also included in the procedure parts. Further, No. 3 and No. 5 of the table (A) of FIGS. 2A and 2B are items to be confirmed.

Figure 4A:
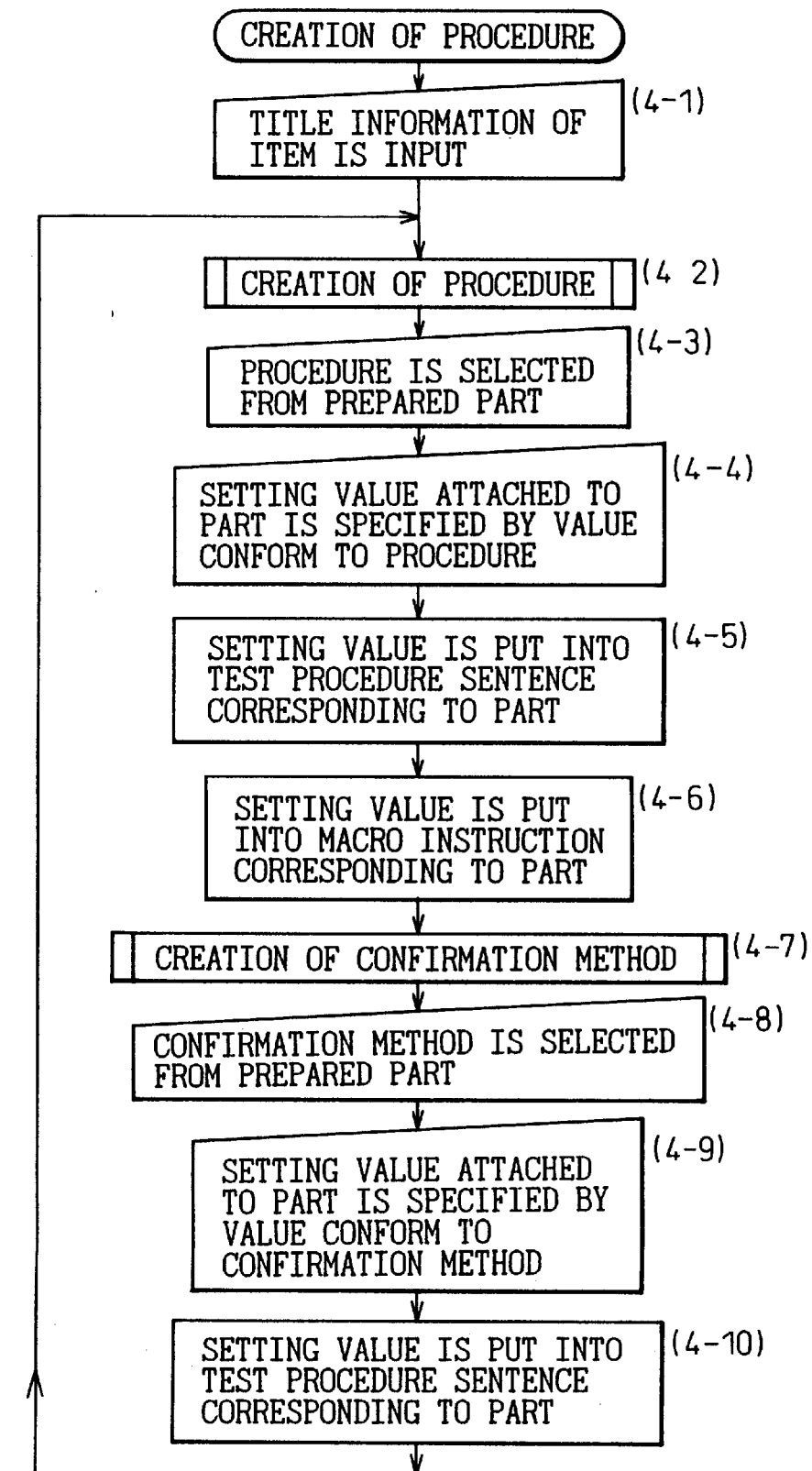
FIGS. 4A and 4B are flow charts of the creation of the test procedure document according to the embodiment of the present invention.
Figure 4B:
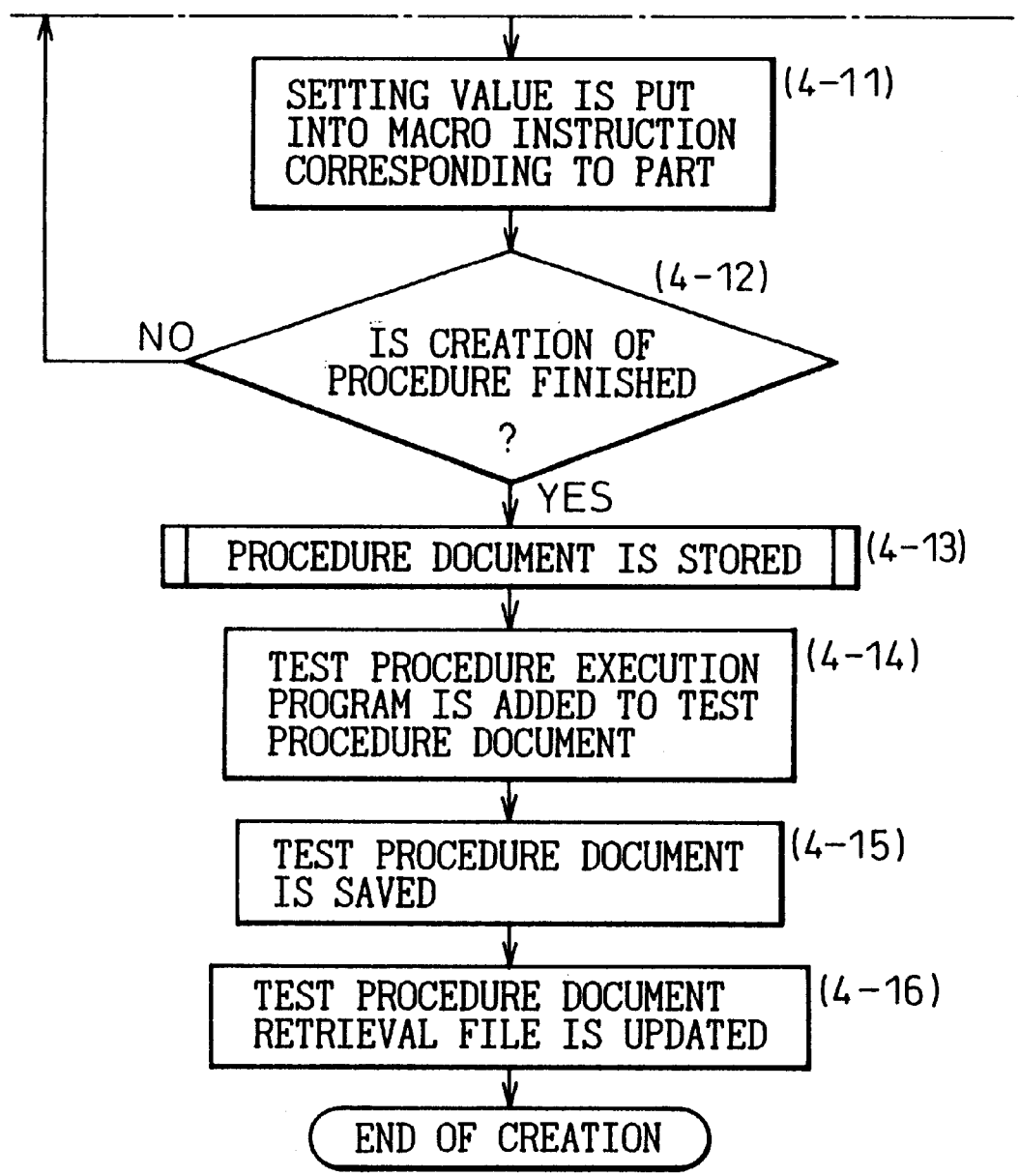
Figure 7A:
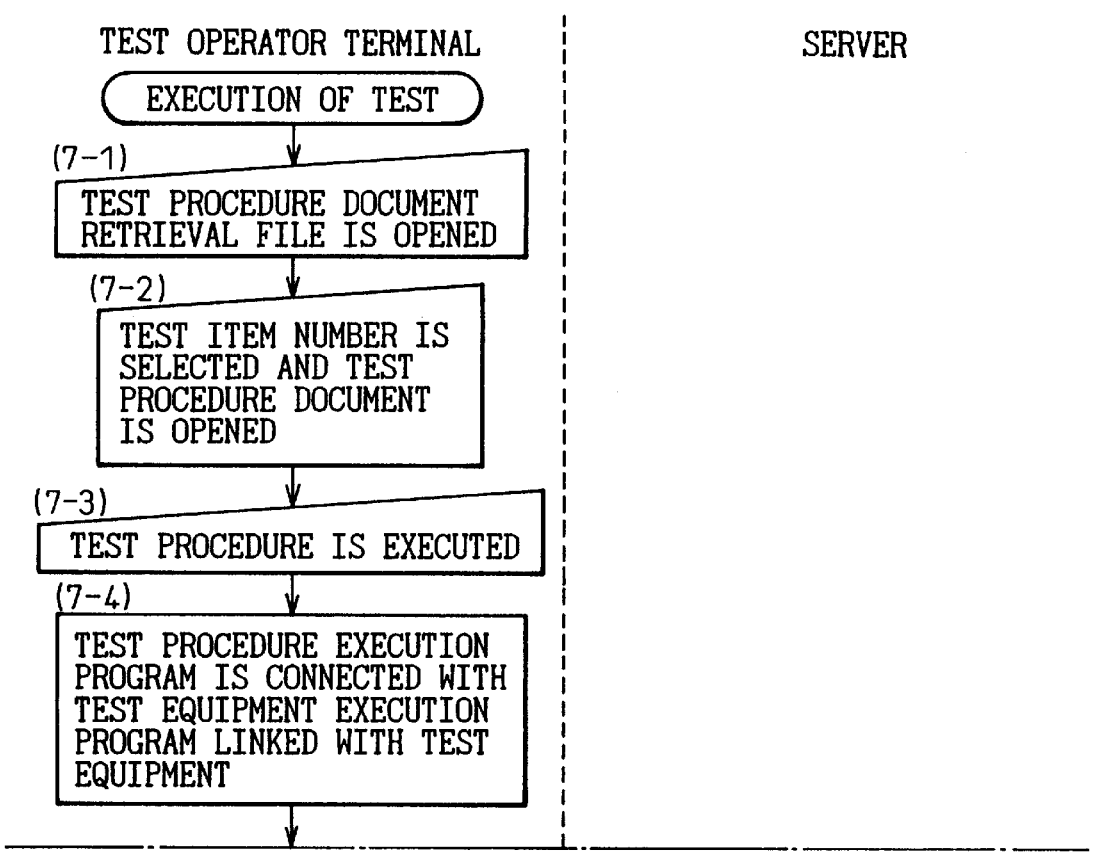

FIGS. 3A and 3B are explanatory views of creation of the test procedure document according to the embodiment of the present invention. Further, FIGS. 4A and 4B are flow charts of the creation of a test procedure document according to the embodiment of the present invention. In FIGS. 3A and 3B, 151 is a test procedure document creation editor, 31 a display screen for creation of the test procedure document, 32 input columns of the display screen, 33 a procedure parts table, 34 test procedure sentences, 152 a procedure parts dictionary, 153 a test procedure document file, and 131 a test procedure retrieval file.

Further, (4-1) to (4-16) of FIGS. 4A and 4B are steps of creation of the test procedure document. Note that numerals (4-2) to (4-11) and (4-14) shown in FIGS. 3A and 3B are operations corresponding to steps of the same numerals in FIGS. 4A and 4B. Below, an explanation will be made of the creation of a test procedure document according to the embodiment of the present invention by referring to FIGS. 3A and 3B and FIGS. 4A and 4B.

First, in the test procedure document creation terminal 15, when the test procedure document creation editor 151 is started by the test procedure document creator, the screen 31 for creation of test procedures is displayed. A test item number, a test item name, and a due day of the test are input as the title information of a test item to the predetermined input columns 32 on the display screen (4-1).

The test procedure document creation editor 151 executes the program for creation of the test procedure document (4-2), displays the procedure parts table 33 of the type prepared in the procedure parts dictionary 152, further displays the test procedure sentences 34 from the table 33, and performs the processing for the creation of the test procedures from step (4-3) to step (4-6).

First, the test procedure document creator selects the sentences conforming to the test procedures from the displayed screen (4-3). Next, it specifies and sets the setting values by the notations of procedures contained in the test procedure sentences of the selected procedure parts to values conforming to the contents of the test (4-4). Then, the test procedure document creation editor 151 creates the sentences of the test procedures by converting the notations of procedures to the specified setting values (4-5) and creates the macro instructions by converting the notations of procedures of the corresponding macro instructions to the specified setting values in the same way as with the creation of the sentences of the test procedures (4-6).

Next, the confirmation procedure creation program in the test procedure document creation editor 151 is started (4-7), the processing for the creation of the confirmation procedures of steps (4-8) to (4-11) is carried out, and both the sentences and the macro instructions of the confirmation procedures are created. The processing for the creation of the procedure of steps (4-8) to (4-11) consists of similar steps from steps (4-3) to (4-6) for the creation of the test procedure mentioned above, therefore overlapping explanations will be omitted.

Next, it is judged if the creation of all tests or confirmation procedures has ended (4-12). If it has not ended, the above steps (4-2) to (4-11) are repeated to describe the series of test procedures, and thereby create the test procedure document.

When the description of the series of test procedures has ended, the program for storing the created test procedure document file 153 in the server 13, as the test procedure document file 132, is started (4-13), and the processing of steps (4-13) to (4-16) is carried out.

First, both a button for starting the test procedure execution program and the destination link (called link) of the test procedure execution program are added into the test procedure document (4-14), the test procedure document file 153 is stored in the test procedure document file 132 (4-15), and an individual item division tag as well as the test item number, test item name, due day of test, and destination link name of the test procedure document file are added to the test procedure document retrieval file 131 based on the created test procedure document file 153 to update the test procedure document retrieval file 131 (4-16).

The test procedure document is described in an HTML form and is comprised by a part consisting of the sentences of the test procedures, a part consisting of the macro instructions corresponding to the test procedures, a part describing the destination link (called link name) of the test procedure execution program for executing the macro instructions, and a part consisting of the data of the test results to be added after the execution of the test. These parts are separated from each other by tags.

FIGS. 5A and 5B are views of an example of creation of a test procedure document according to the embodiment of the present invention. The test procedure document is created by using both the test procedure document creation editor 151 and the procedure parts dictionary 152 according to the above steps and is comprised by a combination of both the standardized sentences of the test procedures and the corresponding macro instructions. The test procedure document shown in the figures shows test procedures for a connection test of a call forwarding service.

First, the telephone number of a telephone set [A1] is set to for example [9821001] by the procedure 5-1, the telephone number of a telephone set [B1] is set to for example [9821002] by the procedure 5-2, and the telephone number of a telephone set [C1] is set to for example [9821003] by the procedure 5-3.

Next, a call forwarding service is registered for the telephone set [A1] by the procedure 5-4. It is then confirmed if the call forwarding service is registered for the telephone set [A1] by the procedure 5-5.

A handset of the telephone set [A1] is picked up to place the set in the "off-hook" state by the procedure 5-6, the dial tone at the telephone set [A1] is confirmed by the procedure 5-7, the call forwarding connection from the telephone set [A1] to the telephone set [B1] is registered by the procedure 5-8, the service tone at the telephone set [A1] is confirmed by the procedure 5-9, and the handset of the telephone set [A1] is hung up to place the set in the "on-hook" state by the procedure 5-10.

Next, the handset of the telephone set [C1] is picked up to place the set in the "off-hook" state by the procedure 5-11, the dial tone at the telephone set [C1] is confirmed by the procedure 5-12, the telephone number of the telephone set [A1] is dialed from the telephone set [C1] by the procedure 5-13, and a ring back tone at the telephone set [C1] is confirmed by the procedure 5-14.

Next, the handset of the telephone set [B1] is picked up to place the set in the "off-hook" state by the procedure 5-15, the telephone set [C1] performs a speech operation with the telephone set [B1] by the procedure 5-16, and the telephone set [B1] performs a speech operation with the telephone set

[C1] and they mutually confirm the speech signal by the procedure 5-17.

Finally, the handset of the telephone set [C1] is hung up to place the set in the "on-hook" state by the procedure 5-18, the handset of the telephone set [B1] is hung up to place the set in the "on-hook" state by the procedure 5-19, then both the test of the call forwarding connection and the procedure of confirmation of the call forwarding connection are ended.

The above procedures 5-1 to 5-4, 5-6, 5-8, 5-10, 5-11, and 5-13 and 5-15 to 5-19 are test procedures, and 5-5, 5-7, 5-9, 5-12, 5-14, 5-16, and 5-17 are confirmation procedures.

Macro instructions are created corresponding to the procedures. ID's indicating whether the macro instructions are for inputting commands to the test equipment 12 or for confirming the test results in the test equipment execution program, are added to the headers of the macro instructions.

FIG. 6 is an explanatory view of the execution of test procedures according to the embodiment of the present invention. Also, FIGS. 7A and 7B and FIGS. 8A and 8B are flow charts of the execution of test procedures according to the embodiment of the present invention. In FIG. 6, 12 is the test equipment, 13 is the server, 131 is the test procedure document retrieval file, 132 is the test procedure document file, 133 is the test procedure execution program, 134 is the test equipment execution program, 135 is the test execution history file, 16 is the test operator terminal, 161 is the browser, 162 is the test procedure document retrieval file, 163 is the test procedure document file, and 164 is the test procedure execution program.

In FIGS. 7A and 7B and FIGS. 8A and 8B, (7-1) to (7-17) are steps for execution of test procedures. Note that numerals (7-1) to (7-5), (7-7), (7-10), (7-11), and (7-13) shown in FIG. 6 show operations corresponding to the steps of the same numerals of FIGS. 7A and 7B or FIGS. 8A and 8B. Below, an explanation will be made of the method for execution of test procedures according to the embodiment of the present invention by referring to FIG. 6, FIGS. 7A and 7B, and FIGS. 8A and 8B.

First, the test operator opens the test procedure document retrieval file 131 from the server 13 via the network 14 by the browser 161 in the test operator terminal 16 (7-1).

Next, the operator selects, from the opened test procedure document retrieval file 162, the number of the test item to be executed to open the test procedure document file 132 (7-2) and pushes the button for execution of the test procedure displayed on the opened test procedure document file 163. By this, the test procedure execution program 133 is read from the destination link (called link) by the browser 161, and the thus read test procedure execution program 164 is started (7-3).

The started test procedure execution program 164 is connected to the test equipment execution program 134 in the server 13 connected to the test equipment 12 via the network 14 (7-4). Further, the test equipment execution program 134 logs into the test equipment 12 at the time of connection with the test procedure execution program 133 to prepare to start the test (7-5).

The test procedure execution program 164 reads one macro instruction's worth of data from the part of the test procedure document consisting of the macro instructions after connection with the test equipment execution program 134 (7-6) and sends the thus read macro instruction to the test equipment execution program 134 (7-7).

The test equipment execution program 134 discriminates whether the received macro instruction is for inputting a command to the test equipment 12 or for confirmation of the test results by the ID at the header of the macro instruction (7-8) and, in the case of an input command (7-9), converts the macro instruction to the input command (or input control signal) conforming to the test equipment 12, applies the input command to the test equipment 12 (7-10), and stores the data of the test results output from the test equipment 12 with respect to the input command into the test execution history file 135 (7-11).

When the above macro instruction is a command for confirming the test results, the test equipment execution program 134 executes the confirmation command and judges the quality of the related test results from the data of the test results stored in the test execution history file 135 according to the judgement conditions of the confirmation command (7-12).

The judged confirmation result is added to the test procedure document file 132 in the server 13 (7-13), and the confirmation result is notified to the test procedure execution program 164 (7-14). The test procedure execution program 133 judges if all of the test procedures have been ended when receiving the test results with respect to a macro instruction from the test equipment execution program 134 (7-15). When they have not been ended, it returns to the above step (7-6) and repeats similar processing.

If all test procedures are ended or if an abnormality of the test results is detected in the middle of the process, the test procedure execution program 164 breaks the connection with the test equipment execution program 134 linked with the test equipment 12 (7-16). The test equipment execution program 134 then logs out from the test equipment 12 and breaks the connection with the test equipment 12 at the time of disconnection from the test procedure execution program 164 (7-17).

Figure 10A:
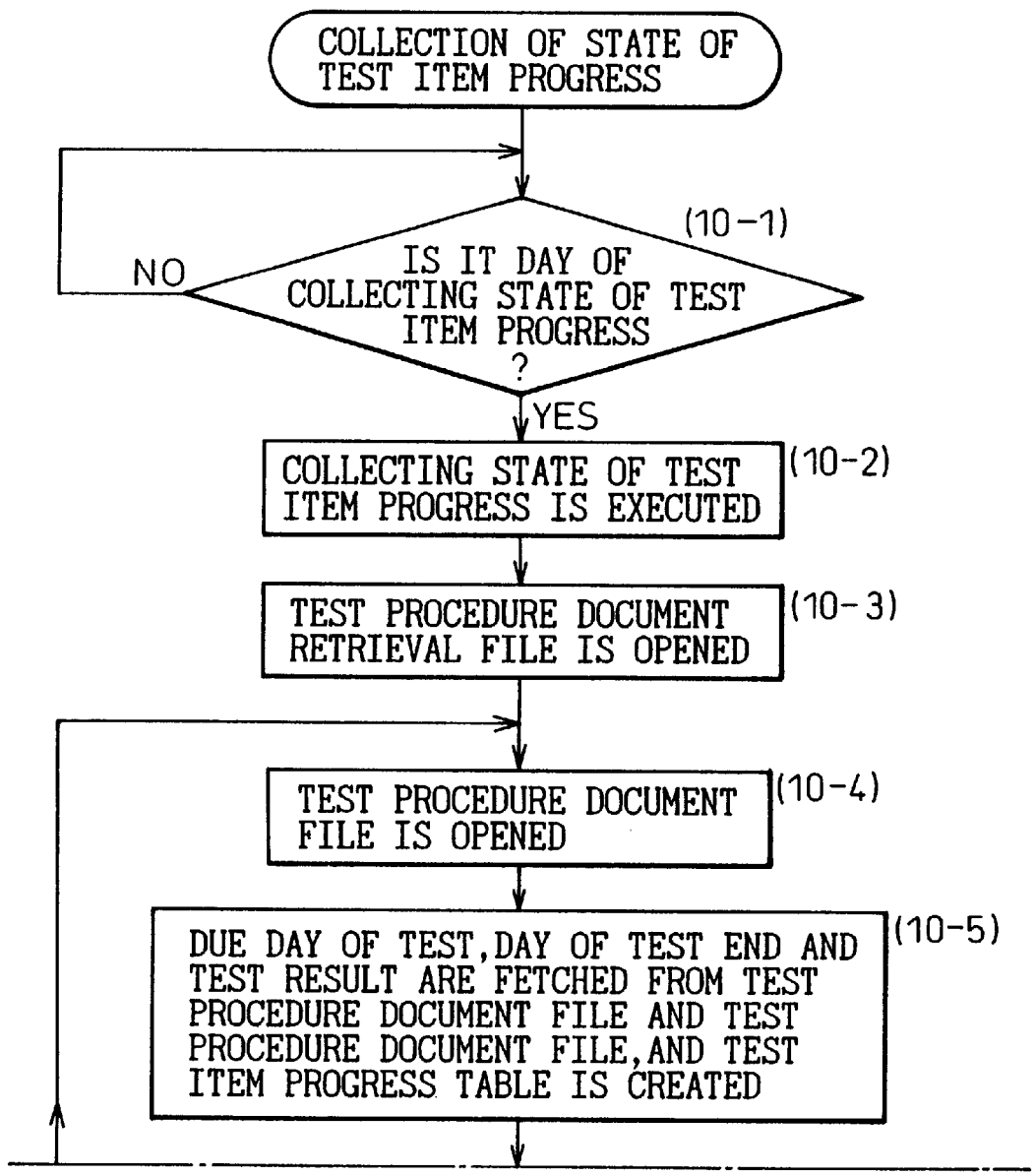
FIGS. 10A and 10B are flow charts of the creation of a report on the state of progress in test items according to the embodiment of the present invention.
Figure 10B:
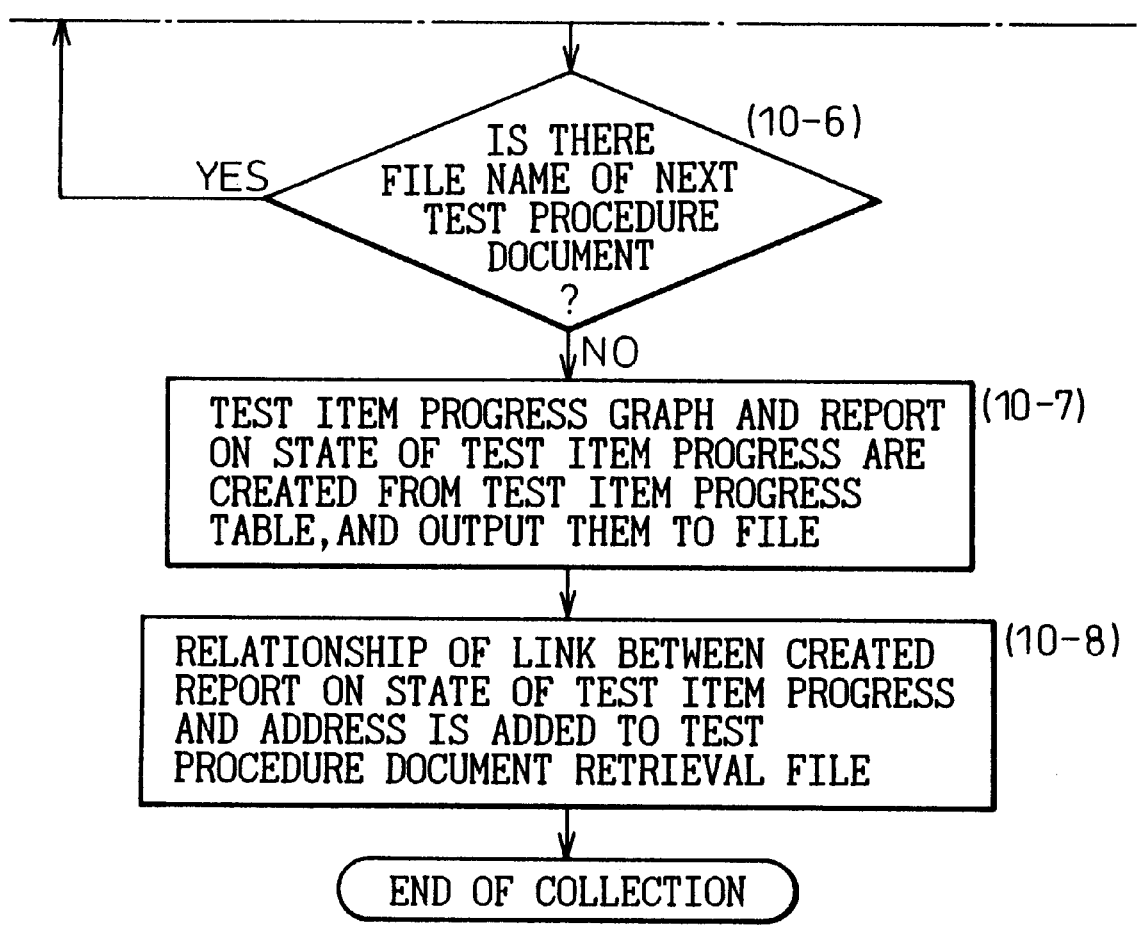

FIGS. 9A and 9B are explanatory views of the creation of the report on the state of progress in test items according to the embodiment of the present invention. Further, FIGS. 10A and 10B are flow charts of the creation of the report on the state of progress in test items according to the embodiment of the present invention. In FIGS. 9A and 9B, 131 is the test procedure retrieval file, 132 is the test procedure document file, 137 is the report on the state of progress in test items, and 9-1 is a test item progress table.

In FIGS. 10A and 10B, (10-1) to (10-8) are steps of the creation of the report on the state of progress in test items. Note that the numerals (10-5) and (10-8) shown in FIGS. 9A and 9B indicate operations corresponding to steps of the same numerals of FIGS. 10A and 10B. Below, an explanation will be made of the creation of the report on the state of progress in test items according to the embodiment of the present invention by referring to FIGS. 9A and 9B and FIGS. 10A and 10B.

First, the server 13 periodically starts the program 136 for collecting data on the state of progress in test items. The program 136 for collecting data on the state of progress in test items then discriminates if the present day is a day for collecting data on the state of progress in test items (10-1). If it is a day for collecting data on the state of progress in test items, it collects the data on the state of progress in test items (10-2), opens the test procedure document retrieval file 131 (10-3), fetches the test item number, number of test items, and due day of test from the test procedure document retrieval file 131, stores them in the test item progress table 9-1, opens the test procedure document file 132 by the test procedure document destination link name (10-4), fetches the data of the day of test end (results day) and test execution result (quality) from the test procedure document file 132, creates the test item progress table 9-1 (10-5), judges if there is a file name of the next test procedure document in the test procedure document retrieval file 131 (10-6), repeats the processing from the above step (10-4) if there is the file name of a next test procedure document, creates the report 137 on the state of progress in test items indicating the number of scheduled test items and the number of actual test items in the form of a graph in the order of the date based on the tabulated test item progress table 9-1 (10-7), and adds, in the test procedure document retrieval file 131, the link between the title of the created report 137 on the state of progress in test items and the address at which the report is to be stored (10-8).

The test manager opens the test procedure document retrieval file 172 by the browser 171 at any time and opens the report 137 on the state of progress in test items created from the test procedure document retrieval file 172 to view the report 137 on the state of progress in test items displayed on the test manager terminal 17 and thereby can manage the state of progress in test items.

The system for execution of test procedures of the electronic exchange according to the embodiment of the present invention can create the test procedure document, execute a test, or manage a test from a remote terminal by connecting the test equipment for testing the electronic exchange with the test procedure document creating terminal, test operator terminal, and test manager terminal via a server and a network.

Note that in the execution of the present invention, it is not necessary to individually provide dedicated terminals for the test procedure document creating terminal, test operator terminal, and test manager terminal. They can be constituted by dual use of a general purpose data processor, work station, or the like. Further, it is also possible to constitute them by directly connecting these test use terminals and the test equipment without going through a network.

Further, an example was shown of storing the test procedure document retrieval file, test procedure document file, test execution history file, program for collecting data on the state of progress in test items, etc. in the server, but it is not always necessary to store these files or programs in the server. They can be stored in any data processor apparatus etc. and made to function in the same way.

Summarizing the effects of the invention, as explained above, according to the present invention, when creating a test procedure document by special commands unique to the test equipment of an electronic exchange, sentences of test procedures prepared in advance are selected and combined by both the procedure parts dictionary 152 and the test procedure document creation editor 151 to create the test procedure document of the macro instructions corresponding to the test procedures, therefore the test procedure document can be easily and efficiently created. Even someone who does not know the commands and the method of operation unique to the test equipment (other than skilled persons) can therefore create a test procedure document.

Further, by establishing correspondence between the sentences of test procedures and the commands of the test equipment, the contents thereof can be easily understood, therefore the created test procedure document can be quickly checked. Further, since the special commands unique to the test equipment of the electronic exchange are not directly described, errors of the test procedure document due to the errors in description are reduced and interruptions of the execution of the test or lowering of the test efficiency during the execution of the test due to errors of the test procedure document can be avoided.

Further, in judging the test results, by recording, in a test parts dictionary, macro instructions corresponding to sentences of the test procedures for judgement of the test results and writing the judgement of the results in the test procedure document when creating the test procedure document, judgement of detailed results is possible during the execution of the test. By this, troublesome confirmation work such as a traces of the test execution history information or judgement of the test results after the execution of the test can be eliminated. Further, turning to the correspondence between the test procedure document and the test results, the test procedure document and the test results form a single file, therefore it becomes easy to establish correspondence between them and to achieve an enhancement of the efficiency of the creation of the test procedure document of the electronic exchange and the test steps and an improvement of the reliability of the test procedure document.

While the invention has been described by reference to specific embodiments chosen for purposes of illustration, it should be apparent that numerous modifications could be made thereto by those skilled in the art without departing from the basic concept and scope of the invention.

What is claimed is:

1. A method for execution of test procedures to test an electronic exchange comprising:

a step of combining, by using a procedure parts dictionary storing procedure parts comprising both sentences of test procedures and setting values contained in the sentences and test execution commands in the form of macro instructions, while making correspondence among these sentences, setting values and macro instructions and a test procedure document creation editor, a plurality of selected procedure parts, generating a test procedure document comprising both sentences of a series of the test procedures and setting values contained in the sentences and macro instructions, in making correspondence among these sentences, setting values and macro instructions, and storing the test procedure document in a test procedure document file; and a step of reading the test procedure document from the test procedure document file by a browser, reading the macro instructions in the test procedure document, starting a test procedure execution program linked with the macro instructions, sending the macro instructions to a test equipment execution program by the test procedure execution program, and inputting test commands to the test equipment connected to the electronic exchange.

2. A method for execution of a test procedure of an electronic exchange as set forth in claim 1, wherein the procedure parts dictionary includes confirmation procedure parts comprising sentences of confirmation procedures and macro instructions which are confirmation procedure execution commands, while making correspondence between these sentences and macro instructions and further provision is made of a step of reading the macro instructions in the test procedure document containing confirmation procedures generated by the test procedure document creation editor and inputting the test commands including the confirmation commands to the test equipment connected to the electronic exchange and a step of writing data of the test results into the test procedure document file.

3. A method for execution of a test procedure of an electronic exchange as set forth in claim 2, wherein further provision is made of a step of retrieving the test procedure document file by a test procedure document retrieval file, periodically extracting the data of the test results in the test procedure document file by a program for collecting data on the state of progress in test items, and collecting the data of the test results to create a report on state of progress in the test items.

4. A system for execution of test procedures to test an electronic exchange comprising a server connected to test equipment for testing the electronic exchange, a test procedure document creating terminal and a test operator terminal, both connected to the server;

the test procedure document creating terminal being provided with a memory device storing a procedure parts dictionary storing procedure parts comprising both sentences of the test procedures and setting values contained in the sentences and test execution commands in the form of macro instructions, while making correspondence among these sentences, setting values and macro instructions and a test procedure document creation editor for creating a test procedure document comprising sentences of a series of test procedures, comprised from a plurality of procedure parts selected from the procedure parts dictionary, setting values contained in the sentences and macro instructions, while making correspondence among these sentences, setting values and macro instructions;

the server being provided with a memory device storing a test procedure document file for storing the test procedure document created by the test procedure document creating terminal, a test procedure document retrieval file for retrieving the test procedure document file, a test procedure execution program linked to the macro instructions in the test procedure documents, and a test equipment execution program for inputting the test commands to the test equipment based on the macro instructions sent by the test procedure execution program; and the test operator terminal being provided with a memory device storing a browser for reading the test procedure document retrieval file, test procedure document file, and test procedure execution program, all contained in the server, and starting the test procedure execution program read by the browser so as to execute the test procedures.

5. A system for execution of a test procedure of an electronic exchange as set forth in claim 4, wherein the procedure parts dictionary comprising sentences of confirmation procedures and confirmation procedure execution commands in the form of macro instructions, while making correspondence between these sentences and macro instructions; the test procedure document creation editor is configured to generate the test procedure document comprised of sentences of a series of the test procedures comprised from a plurality of the procedure parts including the confirmation procedures selected from the procedure parts dictionary and macro instructions, while making correspondence between these sentences and macro instructions; and the server is provided with a test execution history file for storing data of the results of tests executed by the test procedure execution program and is configured to judge the test results from the test execution history file by the macro instructions of the confirmation procedures and store the results in the test procedure document file.

6. A system for execution of a test procedure of an electronic exchange as set forth in claim 5, wherein the server is provided with a memory device for storing a program for collecting data on the state of progress in test items which periodically extracts the data of the test results in the test procedure document file and collects the data of the test results to create a report on the state of progress in the test items and is provided with a test manager terminal which is connected to the server and has a memory device for storing a browser to read the report on the state of progress in the test items created by the program for collecting data on the state of progress in the test items.

7. A system for execution of a test procedure of an electronic exchange as set forth in claim 4, wherein the server and at least one of the test procedure document creating terminal and the test operator terminal are connected via a network.

8. A system for execution of a test procedure of an electronic exchange as set forth in claim 5, wherein the server and at least one of the test procedure document creating terminal and the test operator terminal are connected via a network.

9. A system for execution of a test procedure of an electronic exchange as set forth in claim 6, wherein the server and the test manager terminal are connected via a network.

10. A system for execution of a test procedure of an electronic exchange as set forth in claim 7, wherein the server and the test manager terminal are connected via a network.

11. A system for execution of a test procedure of an electronic exchange as set forth in claim 8, wherein the server and the test manager terminal are connected via a network.

\* \* \* \* \*